May 16, 1939.  A. S. HAISLIP  2,158,236
PORTABLE CAMP STOVE
Filed Jan. 29, 1938  2 Sheets—Sheet 1
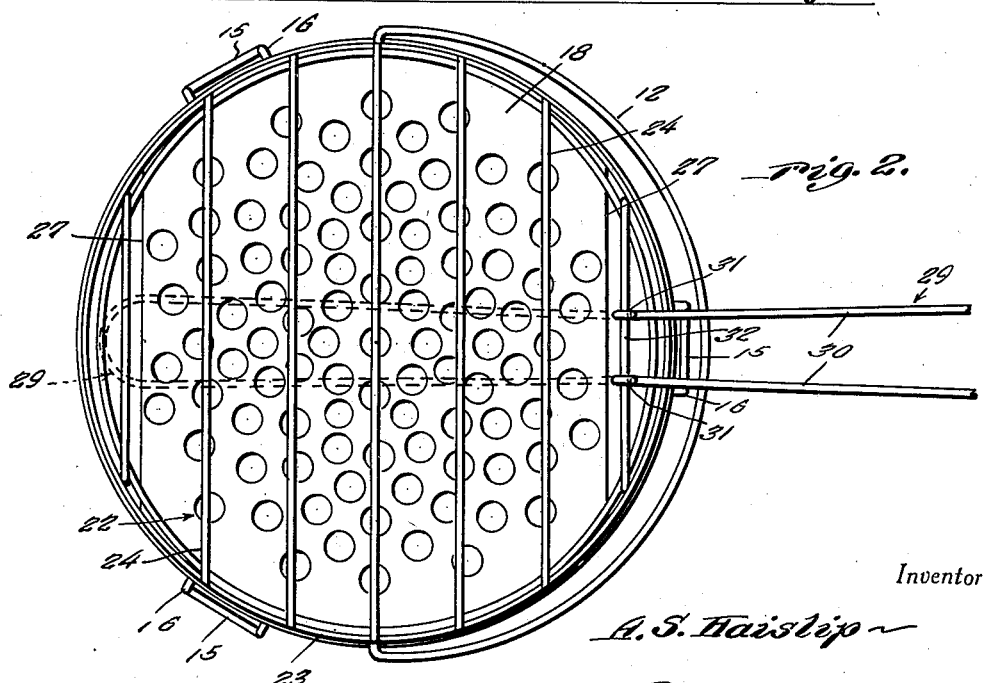

May 16, 1939. A. S. HAISLIP 2,158,236
PORTABLE CAMP STOVE
Filed Jan. 29, 1938   2 Sheets-Sheet 2
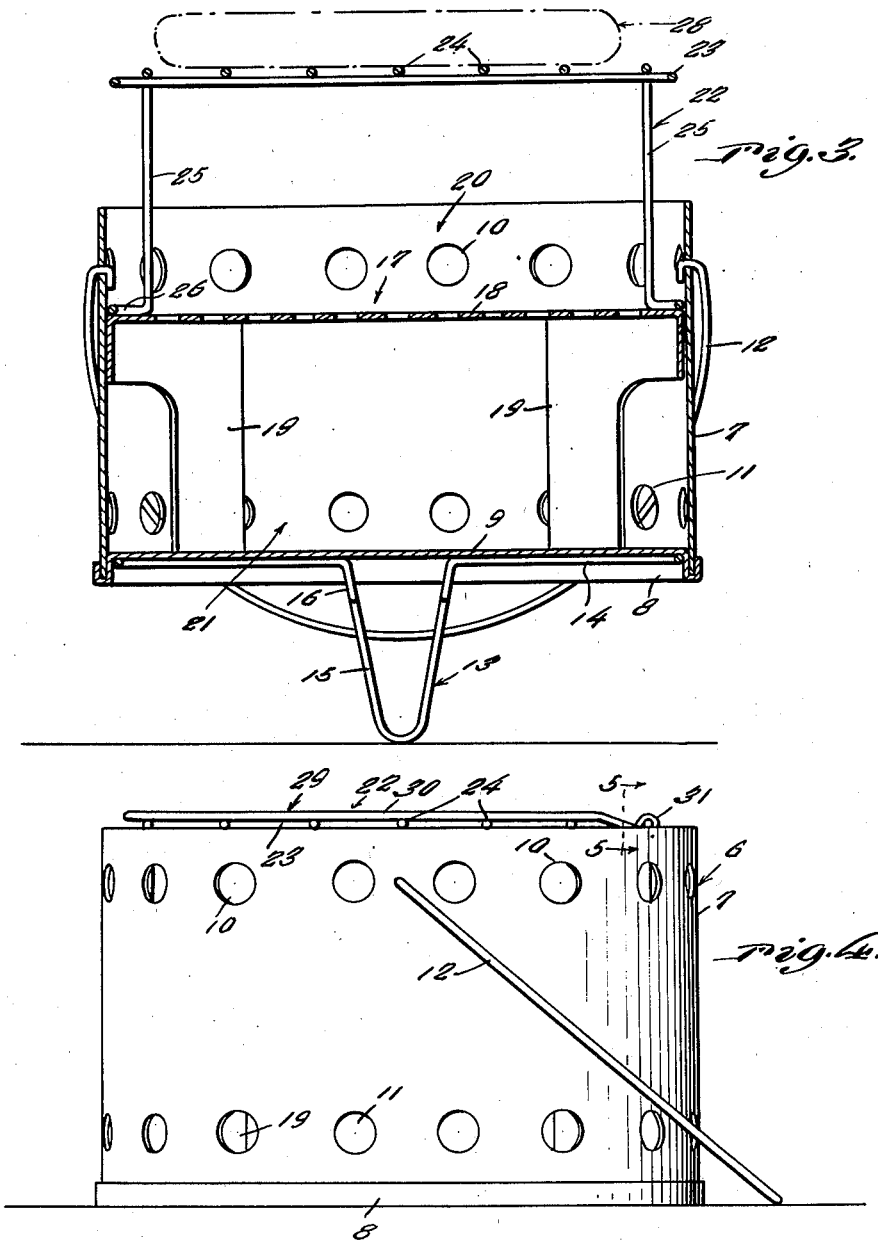
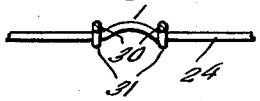
Inventor
A. S. Haislip
By Clarence A. O'Brien
Hyman Berman
Attorneys Patented May 16, 1939

2,158,236

UNITED STATES PATENT OFFICE 2,158,236

PORTABLE CAMP STOVE

Albert S. Haislip, Fredericksburg, Va.

Application January 29, 1938, Serial No. 187,768

7 Claims. (Cl. 126—29)

This invention relates to what is believed to be a structurally distinct and novel portable camp or field stove, the same having been conceived and mechanically perfected with a view toward providing tourists, anglers and the like with a practical and inexpensive accessory for ready and convenient use.

I am sufficiently conversant with the general state of the prior art to realize that many different types of wood and coal and coke burning camp stoves have been heretofore patented and used. Nevertheless, and notwithstanding the recognized field of invention, I have evolved and produced a construction having incorporated therein appreciable features of refinement and distinction such as cooperate in providing an improved construction.

In setting out to reduce to practice the preferred embodiment, I have adopted a lightweight metal structure characterized in particular by a reticulated casing having removably located therein a novel grate unit or insert, whereby to provide an assembly to conveniently accommodate kindling material in the bottom and slow burning charcoal briquettes in the top.

Considered from a further viewpoint, the chosen structure relies additionally for structural newness on a bail equipped container having the aforementioned removable insert, the container being adapted to set upon a simple stand or base, and there being further incorporated an adjustable grille unit forming a suitable grid for broiling and cooking purposes in general.

Other features and advantages will become more readily apparent from the following description and accompanying illustrative drawings.

In the drawings, wherein like numerals are employed to designate like parts throughout the views:

Figure 1 is a central vertical sectional view through the assembled structure with the details perfected in accordance with my ideas, the projectable grille unit being shown retracted, so to speak, to accommodate a coffee pot or the like.

Figure 2 is a top plan view with the parts appearing completely in elevation.

Figure 3 is a view at right angles to Figure 1, the section being taken on the vertical line 3—3 of Figure 1.

Figure 4 is a side elevation showing the structure set for carrying, the grille handle being folded inwardly to an out-of-the-way carrying position.

Figure 5 is a detailed sectional view showing the hinged connection between the limbs of the U-shaped handle and an adjacent portion of the associated grille unit, the section being approximately on the plane of the line 5—5 in Figure 4.

The main receptacle unit or part of the sectional assembly is denoted at 6. As before implied, this is in the nature of an open top cylindrical casing or receptacle. The annular rim or wall, which is lightweight sheet metal, is indicated at 7 and has its lower edge seating in the marginal channel 8 of the slightly elevated disk-like bottom 9 (see Figures 1 and 3). At the top I provide a row of circumferentially spaced draft openings or vents 10. A similar row of openings 11 are formed adjacent the bottom. The wire carrying bail is denoted by the numeral 12.

When in use this miniature bucket-like casing finds suitable elevated rest on the base or stand unit 13, the latter comprising a horizontal supporting ring and depending legs or props 15. The ring 14 fits into the elevated bottom as brought out to advantage in Figures 1 and 3. It will be noted that the legs 15 are slightly off-set as indicated at the point 16 to provide retention shoulders. This provides a convenient anti-slipping support for the surrounding skirt portion of the unit 6, as is obvious. It also permits disconnection of the parts to facilitate transportation and carrying. When the stand is reversed, that is, turned upside down with the legs projecting upwardly, it is possible to compactly telescope the casing into the stand. The laterally off-set legs do not interfere with this setting of the casing into the reversed stand.

The aforementioned insert 17 is primarily a coal grate. That is to say, it includes a divider plate 18 apertured to provide a base for the briquettes (not shown). Although the part 17 may be otherwise constructed, (similar to a grille), it is preferably stamped out of metal and includes spaced supporting legs 19 resting on the bottom 9 as brought out to advantage in Figures 1 and 3. The unit 17 is of a height less than the height of the wall 7 and hence the divider plate 18 serves to define upper and lower chambers or compartments 20 and 21 respectively. The compartment 21 is adapted to be filled with ready burning kindling material such as newspaper or the like. The paper is packed in place and then the lid-like unit 17 is slipped down into the container 7 to compress the paper for satisfactory combustion. It will be noted that the legs 19 do not house in the paper (not shown) but allow it free circulation of air. Consequently, a circulating draft is provided through the openings 11, the openings in the plate 18 and the top ports or openings 10. The upper shallow compartment 20 is adapted to confine therein the blocks of charcoal, and in practice I found it expedient and practicable to utilize long burning individual charcoal charquettes or briquettes (not shown) as they are generally known in the trade. These ignite rapidly and burn for a considerable period of time, sufficient for ordinary camp cooking purposes.

Considering now the grid or grille unit 22, it will be observed that the grid proper is composed of a marginal ring 23 and a series of crosswires or rods 24. Then too, at diametrically opposite points I provide depending supporting legs 25. The latter have outturned or laterally directed feet 26 on their lower ends to be used in either of the two ways shown in Figures 1 and 3 respectively. In this connection it will be observed that opposite diametrically disposed edge portions of the grate plate 18 are cut off as indicated at 27. It will be noticed that by cutting off the edge portions of the plate 18 at diametrically opposite points, segmental spaces are provided between said edge portions and the surrounding wall or shell 7 and these spaces serve to allow the legs 25 to telescope down into the container as shown in Figure 1, that is, when the grid is lowered to its retracted position. When in this position the unit 22 occupies the so-called submerged state and then the grille is disposed on a level with the open top of the surrounding container, the ends of the cross-wires extending sufficiently beyond the ring 23 to rest on the upper edge and to adequately support said unit. Thus, as brought out to advantage in Figure 1 with the grille unit in this position, it provides an adequate support for coffee-pots or equivalent cooking utensils.

For broiling or cooking meat or for toasting bread, the grille unit is lifted bodily up and turned through an orbital path so as to seat the feet 26 on the marginal edge portions of the plate 18. This is shown in Figure 3 wherein the dotted line Figure 28 supposedly represents a frankfurter or the like. In this elevated position the article of food is sufficiently high above the smoldering fire to avoid burning. Consequently, the part 22 is of a two-way or adjustable character.

In practice it is understood that a wad of newspaper or any other handy kindling is packed sufficiently tight into the bucket-like receptacle 7. The parts 17 and 22 are removable for this purpose. Then the part 17 is inserted and pushed well down so as to sufficiently pack the paper, if paper is used. With the insert 17 in place, the top compartment 20 becomes handy for placement of the lumps of coal, briquettes or equivalent fuel. Now the stove is ready to use, assuming that the grille 22 has been placed in either of the positions shown in Figures 1 or 3. The paper can be ignited through the holes 11. When once it starts burning a good circulation and draft is set up, due to the coordination of the various holes, and in a short interval of time the fuel in the top 20 becomes ignited. In practice it has been found that about ten minutes will turn the coals "red hot" to allow the cooking operation to be started. As before stated, the grille 22 is lowered or retracted when heavy articles are placed thereon such as when cooking coffee or frying eggs in a pan or the like.

It is elevated to the position shown in Figure 3 when broiling or toasting food.

The simplicity is such as to obviate the necessity of embodying a more detailed or lengthy description of construction or operation.

It is both desirable, as well as advisable, to provide means for handling the aforesaid grille unit or assembly 22. Thus, I have conveniently adopted a folding handle 29. Although this may be otherwise devised, it is, by choice, of elongated U-shaped form as depicted in the drawings. In this form, the limbs 30 terminate in hinging eyes 31, these being pivotally connected (see Figure 5 in particular) to the bend 32 occurring in the most convenient cross-rod or wire 24.

When in use the handle extends outwardly as in Figure 1; while when not in use it folds down on and overlies the grid as noted in Figure 4 and in dotted lines in Figure 2. The latter position is the carrying position.

While the preferred embodiment of the invention has been shown and described, it is to be understood that minor changes coming within the field of invention claimed may be resorted to if desired.

I claim:

1. A portable camp stove comprising a receptacle open at its top and including an imperforate bottom and an upstanding enclosing wall, said wall being provided with upper and lower rows of circumferentially spaced draft openings, and an apertured divider partition in said container located midway between the upper and lower rows of holes, said partition being in the nature of a removable insert and having depending supporting legs resting on the bottom of the container.

2. A camp stove comprising an open top casing including an imperforate bottom and an upstanding marginal apertured wall, a leg supported grate insert removably arranged in said casing and including an apertured plate serving as a horizontal divider and defining individual upper and lower compartments, and a leg supported utensil supporting and cooking grille unit detachably and adjustably associated with said insert.

3. A camp stove comprising an open top casing including an imperforate bottom and an upstanding marginal apertured wall, a grate insert removably arranged in said casing and including an apertured plate serving as a divider and defining upper and lower compartments, and a utensil supporting and cooking grille unit detachably and adjustably associated with said insert, said grille unit comprising an openwork grid and depending supporting legs and folding handle as described.

4. A portable camp stove of the class described comprising a receptacle adapted to contain and house a source of heat, and a detachable bodily insertable and removable grille unit, said grille unit including a grille member liftable from a normal plane flush with the open top of said receptacle to an elevated position parallel and above said open top to support the articles to be cooked in a position relatively remote from the source of heat and means in said receptacle for supporting the grille unit in said elevated position.

5. A portable camp stove of the variety shown and described comprising a relatively stationary open top receptacle adapted to contain and house an appropriate source of heat, a grate supported in said receptacle, and a grille unit, said grille unit comprising a main grille member and supporting legs therefor, said grille unit being projectable and retractable in relation to the receptacle, the legs being telescopically arranged in the receptacle when the grille unit is in a retracted position, said legs being adapted to rest upon the grate when the grille is in an elevated projected and roasting position.

6. A portable camp stove of the class described comprising a receptacle having an imporforate bottom and an upstanding open top apertured surrounding marginal wall, a perforated grate unit removably arranged in said receptacle and having supporting legs resting on the imperforate bottom, and a companion insertable and removable grille unit, said grille unit including a horizontal main grille member and supporting legs, said supporting legs being adapted to telescope in the receptacle when the grille member is in a lowered retracted position, the legs being adapted to rest on said grate unit when the grille member is in a plane spaced above the open top of said receptacle.

7. A camp stove of the class described comprising an open top casing adapted to contain and house a predetermined source of heat and including an imperforate bottom and an upstanding marginal wall, and a utensil supporting and cooking grille unit detachably and adjustably associated with the casing, said unit having guide and retention means depending telescopically in the casing and an open-work utensil support-grille, together with a folding handle hingedly attached to the marginal portion of the grille and projectable laterally beyond said wall when in use and swingable into overlapping relation with the grille when not in use.

ALBERT S. HAISLIP.